United States Patent
Gerö et al.

(10) Patent No.: US 10,708,132 B2
(45) Date of Patent: Jul. 7, 2020

(54) TECHNIQUE FOR HANDLING A STATUS CHANGE IN AN INTERCONNECT NODE

(75) Inventors: Balázs Peter Gerö, Budapest (HU); János Farkas, Kecskemét (HU); László Molnár, Budapest (HU); Panagiotis Saltsidis, Stockholm (SE); Balázs Varga, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 729 days.

(21) Appl. No.: 14/369,322

(22) PCT Filed: Dec. 29, 2011

(86) PCT No.: PCT/EP2011/006606
§ 371 (c)(1),
(2), (4) Date: Jun. 27, 2014

(87) PCT Pub. No.: WO2013/097882
PCT Pub. Date: Jul. 4, 2013

(65) Prior Publication Data
US 2015/0009861 A1    Jan. 8, 2015

(51) Int. Cl.
*H04L 12/24* (2006.01)
*H04L 12/751* (2013.01)

(52) U.S. Cl.
CPC .......... *H04L 41/0816* (2013.01); *H04L 41/00* (2013.01); *H04L 41/12* (2013.01); *H04L 45/02* (2013.01)

(58) Field of Classification Search
CPC ......... H04L 12/24; H04L 41/00; H04L 41/12; H04L 41/0816; H04L 45/02
See application file for complete search history.

(56) References Cited

U.S. PATENT DOCUMENTS

| 7,114,566 B2 | 10/2006 | Vinegar et al. | |
|---|---|---|---|
| 2004/0100971 A1* | 5/2004 | Wray | G06F 11/0709 370/400 |

(Continued)

FOREIGN PATENT DOCUMENTS

| CN | 101262400 A | 9/2008 |
|---|---|---|
| CN | 101877646 A | 11/2010 |

(Continued)

OTHER PUBLICATIONS

Alon, Z. et al. "Requirements for Carrier Ethernet Service Protection over UNIs and E-NNIs." Nokia Siemens Networks/RTP IE Packet Transport Evolution, Jan. 2010, slides 2-4, 13-18 <http://www.ieee802.org/1/files/public/docs2010/new-alon-UNI-ENNI-protection-requirements-0110-v01.pdf>.

(Continued)

*Primary Examiner* — Ruihua Zhang
(74) *Attorney, Agent, or Firm* — Coats & Bennett, PLLC

(57) ABSTRACT

A technique for status change handling in an interconnect node is described, wherein the node comprises a data plane that can assume, per service, a passive or active status. A method aspect in the node comprises transmitting, to another node, a first indication that a change has been or is about to be performed, awaiting, from the other node, reception of a second indication that the data plane in the other node has been set to the passive status, and activating, responsive to the received indication, the data plane of the node from the passive status to the active status. The method aspect in the other node further comprises receiving, from the node, the first indication, passivating, responsive to the receiving step, the data plane being in the active status to the passive status, and transmitting, upon completion of the passivating step, the second indication.

25 Claims, 8 Drawing Sheets

(56) References Cited

U.S. PATENT DOCUMENTS

| | | | |
|---|---|---|---|
| 2008/0291822 A1* | 11/2008 | Farkas | H04L 12/462 370/216 |
| 2009/0245496 A1* | 10/2009 | Maione | H04Q 3/0045 379/201.12 |
| 2009/0296568 A1 | 12/2009 | Kitada | |
| 2010/0157793 A1* | 6/2010 | Sajassi | G06F 11/2007 370/228 |
| 2012/0315030 A1* | 12/2012 | Singh | H04B 10/032 398/1 |
| 2013/0114394 A1* | 5/2013 | Hu | H04L 41/0816 370/216 |

FOREIGN PATENT DOCUMENTS

| | | |
|---|---|---|
| JP | 2005130049 A | 5/2005 |
| RU | 2272363 C2 | 3/2006 |
| WO | 03017586 A1 | 2/2003 |
| WO | 2003040513 A3 | 5/2003 |
| WO | 2005081435 A1 | 9/2005 |
| WO | 2009077002 A1 | 6/2009 |
| WO | 2011099841 A2 | 8/2011 |

OTHER PUBLICATIONS

Farkas, J. et al. "Data Plane for Resilient Network Interconnect." new-farkas-RNI-data-plane-0111-v02.pdf, Jan. 2011, pp. 2-16 <http://www.ieee802.org/1/files/public/docs2011/new-farkas-RNI-data-plane-0111-v02.pdf >.

Farkas, J. "Resilient Network Interconnect Functionalities." new-farkas-network-interconnect-functionalities-0910-v01.pdf, Sep. 2010, pp. 2-13 <http://www.ieee802.org/1/files/public/docs2010/new-farkas-network-interconnect-functionalities-0910-v01.pdf >.

Vissers, M. "DRNI Data Plane Model I/II Comparison & MAC Address Values in DRNI." axbq-vissers-drni-data-plane-model-I-and-II-comparison-1011-v00.pptx, Oct. 2011, slides 3, 33, 51, 52 <http://www.ieee802.org/1/files/public/docs2011/axbq-vissers-drni-data-plane-model-I-and-II-comparison-1011-v00.pptx >.

Institute for Electrical and Electronics Engineers, "IEEE Standard for Local and metropolitan area networks—Virtual Bridged Local Area Networks; Amendment 5: Connectivity Fault Management", IEEE Std 802.1ag-2007, Sep. 27, 2007, pp. 1-260, IEEE.

Telecommunication Standardization Sector of ITU, "Generic protection switching—Linear trail and subnetwork protection", Series G: Transmission Systems and Media, Digital Systems and Networks, Digital networks—General aspects, ITU-T G.808.1, Mar. 1, 2006, pp. 1-60, ITU.

Institute for Electrical and Electronics Engineers, "Draft Standard for Local and Metropolitan Area Networks—Link Aggregation—Amendment: Distributed Resilient Network Interconnect", IEEE P802.1AXbq™/D0.1, May 8, 2011, pp. 1-29, LAN MAN Standards Committee of the IEEE Computer Society.

Institute for Electrical and Electronics Engineers, "IEEE Standard for Local and metropolitan area networks—Link Aggregation", IEEE Std 802.1AX™-2008, Nov. 3, 2008, pp. 1-163, IEEE.

Institute for Electrical and Electronics Engineers, "IEEE Standard for Local and metropolitan area networks—Virtual Bridged Local Area Networks Amendment 10: Provider Backbone Bridge Traffic Engineering", IEEE Std 802.1Qay™—2009 (Amendment to IEEE Std 802.1Q™—2005), Aug. 5, 2009, pp. 1-145, IEEE.

Martini, L, et al., "Inter-Chassis Communication Protocol for L2VPN PE Redundancy", Internet Engineering Task Force Internet Draft, Apr. 25, 2011, pp. 1-78, IETF.

Farkas, J. et al., "Control of the DRNI", Mar. 15, 2011, pp. 1-11, retrieved on Jun. 26, 2014, retrieved from internet: http://www.ieee802.org/1/files/public/docs2011/new-farkas-DRNI-control-0311.pdf.

Huawei Technologies Co., Ltd., "Requirement for protection switching interworking for end-to-end resilience", ITU-T Drafts, Study group 15, Nov. 22, 2011, pp. 1-7, TIU, XP 17568759A.

* cited by examiner

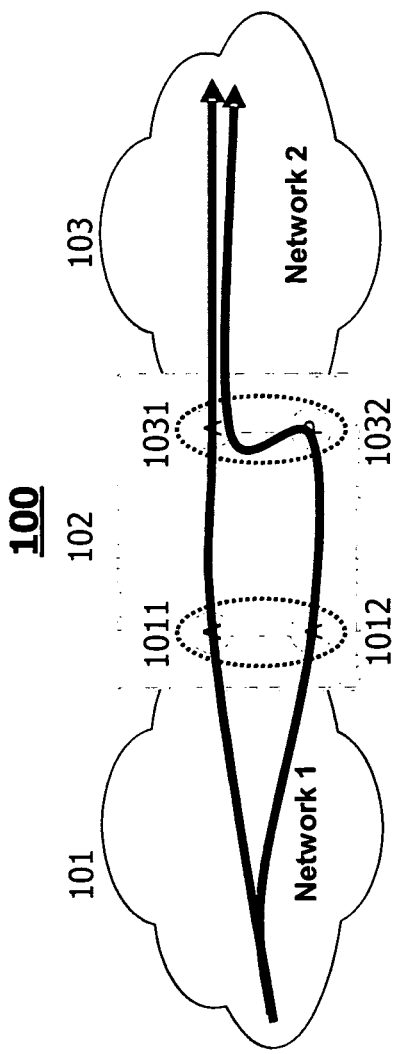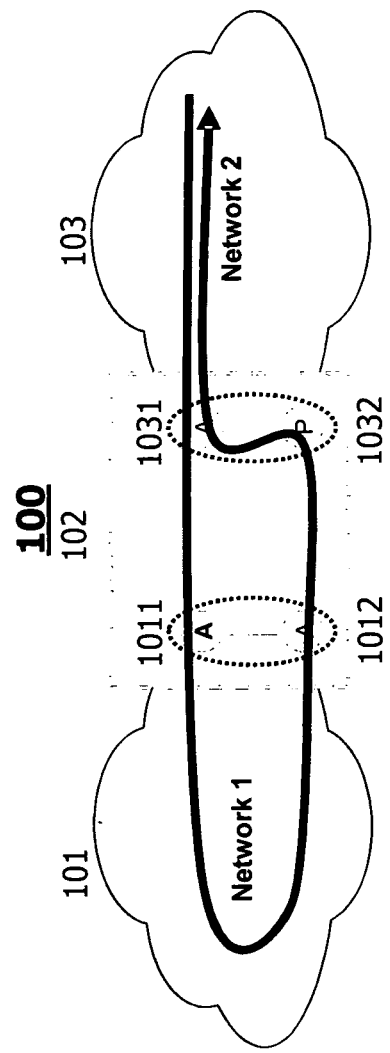

200

TECHNIQUE FOR HANDLING A STATUS CHANGE IN AN INTERCONNECT NODE

TECHNICAL FIELD

The present disclosure generally relates to network interconnection techniques. Specifically, a technique for handling a status change in an interconnect node is described.

BACKGROUND

Large communication systems often comprise a plurality of networks which may be connected with each other via a network interconnect solution. Usually, each network of the communication system comprises a plurality of network nodes which are interconnected through internal links, whereas the networks as a whole are interconnected via external links. Such network nodes which interconnect the networks of the system may be referred to as "interconnect nodes" or "edge nodes".

As an example for interconnect nodes, Distributed Resilient Network Interconnect (DRNI) nodes can be mentioned. Standardization of DRNI is ongoing in IEEE. DRNI may be defined as an extension to the existing IEEE link aggregation standard. DRNI nodes that belong to the same provider may use the Inter-Chassis Communication Protocol (ICCP) to communicate with each other.

Node failures, or faults, may occur in one or more of the interconnect nodes due to a plurality of reasons. Node recovery out of a node fault state is therefore an issue important for network management and maintenance. DRNI node fault management operation rules may be implemented using a linear protection switching approach. As an example network interconnect nodes may implement the International Telecommunication Union Standardization Automatic Protection Switching (ITU-T APS) or IEEE Provider Backbone Bridge Traffic Engineering (PBB-TE) protection switching protocol over a tunnel or physical link between each other, which in case of node (including link or tunnel) faults trigger the node fault management actions.

FIGS. 1A and 1B show possible forwarding errors due to status collisions among two interconnect nodes of one network. In FIGS. 1A and 1B, a communication system 100 comprises a first network 101, a second network 103 and an interconnect interface 102 between the first and second networks 101, 103. The interconnect interface 102 comprises four interconnect nodes, that is, a first node 1011, a second node 1012, a third node 1031 and a fourth node 1032. The first and second interconnect nodes 1011, 1012 belong to the first network 101, whereas the third and fourth interconnect nodes 1031, 1032 belong to the second network 103.

In FIGS. 1A and 1B, the first to third nodes 1011, 1012, 1031 are pre-configured with an active data plane (or active status; depicted by "A") for any given service, whereas the fourth node 1032 is preconfigured with a passive data plane (or passive status; depicted by "P") for any given service. It should be noted that an individual interconnect node 1011, 1012, 1031, 1032, when being operational, could either assume an active status or a passive status with respect to an individual service. Only the interconnect nodes 1011, 1012, 1031 assuming an active status for a given service is enabled to transfer the associated service-related data via an internal link from and towards the associated network 101, 103. The interconnect node 1032 assuming a passive status is only allowed to transfer data to another interconnect node 1011, 1012, 1031.

In FIG. 1A, there are accordingly two active nodes (first and second nodes) 1011, 1012 for a given service at the same time. This situation may cause problems with forwarding, such as duplicate frame delivery of broadcast and unknown frames (see forked double arrow in FIG. 1A), as internal network nodes within the first network 101 (not shown) rely on the fact that only one active interconnect node is present at a time. Thus, the same frame may be relayed to both the first and second nodes 1011, 1012, which two nodes 1011, 1012 then transmit the same frame in duplicate to the third and fourth nodes 1031, 1032. The passive node 1032 will simply relay the received frame to the active node 1031. In turn, the active node 1031 may have no means to check whether the frame received from the active node 1011 and the frame relayed from the passive node 1032 actually are identical. Although such a check was theoretically possible, it would cause an exponential workload on the active node 1031 to check whether an N-th received frame is identical to N−1 stored frames. But even such identity between two frames is found, the active node 1031 cannot be sure whether the identity is actually erroneous, or whether a recipient node (not shown) in the second network 103 has requested a re-transmission of that (identical) frame.

In the scenario depicted in FIG. 1B, basically the same situation as in FIG. 1A arises. In FIG. 1B, broadcast frames and/or unknown frames may be turned back over the DRNI (see "round-trip" arrow in FIG. 1B).

FIG. 2 shows a sequence of events that may lead to the forwarding problems illustrated in FIGS. 1A and 1B. When starting on the left portion of the time axes for both the first node 1011 and the second node 1012, both nodes 1011, 1012 exchange No Request (NR) signals to assure one another that the first and second nodes 1011, 1012 are both operational.

At time "Node 1011 down", the first node 1011 experiences a node fault (including a tunnel or link fault), and thus turns non-operational. Shortly afterwards, for example by means of a network surveillance tool, the second node 1012 is informed of the fault of the first node 1011 at time "Node down detected". Accordingly, the second node 1012 sets its data plane from passive to active so as to back-up the one or more services for which the first node 1011 has had an active status. As shown in FIG. 2, a first Wait-to-Restore (WTR) indication/signal is sent by the second node 1012, but cannot be received by the first node 1011 still being non-operational.

Then, at time "Node 1011 up", the first node 1011 (including an associated link or tunnel) recovers from its fault to the operational state. As soon as the first node 1011 recovers, a local WTR timer is started and the data plane of the first node 1011 is set to passive. Shortly afterwards, at time "Node up detected", the second node 1012 is informed of the first node 1011 having recovered. Likewise, the second node 1012 starts its own local WTR timer. However, not having received a confirmation from the recovery of the first node 1011, the second node 1012 maintains its data plane as active.

As soon as the local WTR timer of the first node 1011 expires, the first node 1011 will set its data plane as active for dedicated services, and substantially at the same time will clear the WTR indication/signal (e.g., from the APS channel). The second node 1012 receives the following NR signal from the first node 1011 with some delay, during which delay the second node 1012 keeps its data plane active for the same services, since prior to reception of the NR signal, the second node 1012 cannot ascertain that the first node 1011 has already set its data plane to an active status.

Hence, during the temporary period marked with "Forwarding problems" in FIG. 2, the first and second nodes 1011, 1012 set their data plane as active for the same services. Within this period, the problems shown in FIG. 1A and FIG. 1B may arise. As soon as the recovered second node 1012 receives the NR signal from the first node 1011, the second node 1012 sets its data plane to passive, and the period of forwarding problems ends.

The problem with the solution illustrated in FIG. 2 resides inter alia in that neither the ITU-T APS nor the IEEE PBB-TE protection switching protocol provides means to coordinate the sequence of actions between the two participating interconnect nodes 1011, 1012. In other words, in existing protocols, the actions of the two active interconnect nodes 1011, 1012 are not coordinated, which results in the above-described problems with respect to frame forwarding (duplicate frame delivery, turn back of frames, etc.).

SUMMARY

It is an object of the technique presented herein to resolve status collisions among interconnect nodes.

In a first aspect, there is provided a method for status handling in an interconnect node, wherein the node comprises a data plane, wherein the data plane in the node can assume, per service, one of a passive status and an active status, and wherein the method is performed in the node and comprises the steps of receiving, from another node, a first indication that a change has been or is about to be performed, passivating, responsive to the receiving step, the data plane being in the active status to the passive status, and transmitting, upon completion of the passivating step, a second indication of the passive status of the data plane to the other node.

In a second aspect, there is provided a method for status handling in an interconnect node, wherein the node comprises a data plane, wherein the data plane in the node can assume, per service, one of a passive status and an active status, and wherein the method is performed in the node and comprises the steps of transmitting, to another node, a first indication that a change has been or is about to be performed, awaiting, from the other node, reception of a second indication that the data plane in the other node has been set to the passive status, and activating, responsive to the received indication, the data plane of the node from the passive status to the active status.

From the perspective of an individual service, a formerly active interconnect node may thus set its data plane as passive before a (e.g., recovering or recovered) interconnect node sets its data plane to active again. The formerly active node may signal completion of setting its data plane as passive, and the corresponding indication may trigger that the (e.g., recovering or recovered) interconnect node sets its data plane as active again.

In the present context, the terms "active status" and "passive status", or "active" and "passive", in relation to an interconnect node indicate the role of the interconnect node in a network interconnect (e.g., in the sense of "for use" and "for backup") per service. These terms do in general not indicate that the corresponding node is operational or broken, or "up" or "down", unless used in that specific context for the purposes of monitoring and fault management.

In general, only an interconnect node assuming an active status for a given service is enabled to transfer associated service-related data via an internal link from and towards an internal node of the associated network. In one configuration, an interconnect node assuming a passive status for a given service is enabled to transfer service-related data to another interconnect node of the same or an interconnected network (see e.g., FIG. 1B). Further, it is not necessary that the other interconnect node is in the active state. Within one network, the other node may also be in the passive state (for instance in a 3-node arrangement as described hereinbelow). The state of the node in the other network may either be passive or active. For instance, DRNI may provide independence for both interconnected networks, so that it can be independently decided which node is to become the single active node for a given service in one network. According to the first and second aspects, the interconnect node may thus be a Distributed Resilient Network Interconnect, DRNI, node.

In a first refinement of the first and second aspects, the change emprises that the node for which the first indication is generated has or will become active for one or more services (as such, the first and/or the second indication may additionally be indicative of the one or more services effected by the change). The change may be comprised in one of the following: a recovery of the interconnect node (including of an associated link or tunnel) from a node fault, a topology change in a network, and a configuration change in a network.

The method may further comprise an interconnect node fault management state machine in the node involving a Wait-to-Restore-Active, WTR-A, state of the node. The WTR-A state may at least one of allow to passivate the data plane to the passive status, and not allow to activate the data plane to the active status. That is, the state definition may ensure that the above-described period (during which both nodes have an active data plane) is avoided.

In a second refinement, there may be defined a set of active services that are pre-set to be served with the active status in the node, and a set of passive services that are pre-set to be served with the passive status in the node. In this case, each service may be described by one of a Virtual Local Area Network, VLAN, and a Service Interface Identifier, I-SID.

In a third refinement, there may be defined a WTR-A signal so as to signal whether the node transits into or from the WTR-A state. If so, there may be a step for setting the WTR-A signal if there is a signal fail, SF, signal. In the latter case, the setting step may be performed responsive to a detection that one of a tunnel and a link associated with the node is down. In the latter case, when referring also to the second refinement, the data plane may be activated for both sets of services. That is, the WTR-A signal may be coupled to the SF signal (which can be equated with a node failure) which allows for fast and reliable setting of the WTR-A signal. In turn, the nodes involved may realize a node fault quickly and may react accordingly.

In a fourth refinement, there may be a step for invalidating the WTR-A signal upon completion of passivating the data plane in the node to the passive status. If so, when referring also to the second refinement, the data plane may be activated only for the set of active services. Further, the invalidation of the WTR-A signal may be preceded by invalidation of the SF signal. In the latter case, the invalidation of the SF signal may be performed responsive to detection that one of a tunnel and a link associated with the node is available. If so, the data plane may be passivated only for the set of passive services. That is, it is possible to perform a safe recovery of the first node, which safe recovery leverages quick recovery of the first node against avoidance of the period with two nodes having the data plane active for the same services.

In a fifth refinement, the WTR-A signal is signalled in a periodically received Physical Data Unit, PDU. If so, the PDU may be associated with at least one Continuity Check Message, CCM, frame received by the node. In the latter case, a flag for the WTR-A signal in the one or more CCM frames may be the second most significant bit of a Flags field of a common Connectivity Fault Management, CFM, header. Alternatively, the PDU may be associated with one of Inter-Chassis Communication Protocol, ICCP, and Link Aggregation Control Protocol, LACP. Alternatively, the PDU may be associated with a received status of external interface links of the node.

In a third aspect, a computer program product is provided, the computer program product comprising program code portions for performing any of the method aspects disclosed herein when the computer program product is executed on one or more computing devices (e.g., on at least one interconnect node). The computer program product may be stored on a computer readable recording medium.

In a fourth aspect, there is provided a device for status handling in an interconnect node, wherein the node comprises a data plane, wherein the data plane in the node can assume, per service, one of a passive status and an active status, and wherein the device comprises at least one processor configured to receive, from another node, a first indication that a change has been or is about to be performed, passivate, responsive to the receiving operation, the data plane being in the active status to the passive status, and transmit, upon completion of the passivating operation, a second indication of the passive status of the data plane to the other node.

In a fifth aspect, there is provided a device for status handling in an interconnect node, wherein the node comprises a data plane, wherein the data plane in the node can assume, per service, one of a passive status and an active status, and wherein the device comprises at least one processor configured to transmit, to another node, a first indication that a change is about to be performed, await, from the other node, reception of a second indication that the data plane in the other node has been set to the passive status, and activate, responsive to the received indication, the data plane of the node from the passive status to the active status.

As a refinement to the fourth and fifth aspects, the interconnect node may be one of a Provider Edge Bridge, a Provider Backbone Edge Bridge and a Virtual Private Local Area Network Service Provider Edge, VPLS PE, node.

In a sixth aspect, an interconnect system is provided, comprising at least a first interconnect node comprising the device according to the fourth aspect, and a second interconnect node comprising the device according to the fifth aspect, wherein the operations of transmitting and receiving the first and second indication are performed between the first and second interconnect nodes.

In a seventh aspect, an interconnect system is provided, comprising at least a first interconnect node comprising the device according to the fourth aspect, a second interconnect node comprising the device according to the fifth aspect, and a third interconnect node comprising the device according to the fifth aspect, wherein the awaiting operation in the third interconnect node is configured to await reception of the second indication from both the first and second interconnect nodes, and wherein the activating operation in the third interconnect node is only performed if the second indication from both the first and second interconnect nodes has been received.

It is to be noted that the interconnect node (and/or the interconnect system) may implement any of the technical details set forth for the method aspects herein, and thus achieves the same advantages. In other words, the interconnect node (and/or the interconnect system) may comprise further components adapted to perform any of the method steps disclosed herein.

BRIEF DESCRIPTION OF THE DRAWINGS

The embodiments of the technique presented herein are described herein below with reference to the accompanying drawings, in which:

FIG. 1A shows a possible forwarding error caused by two active interconnect nodes interfacing one network;

FIG. 1B shows another forwarding error caused by two active interconnect nodes interfacing one network;

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practised in other embodiments that depart from these specific details. For example, the embodiments will primarily be described in the context of the interconnect node; however, this does not rule out the use of less or more devices to implement the present technique.

Moreover, those skilled in the art will appreciate that the services, functions and steps explained herein below may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Figure 3:
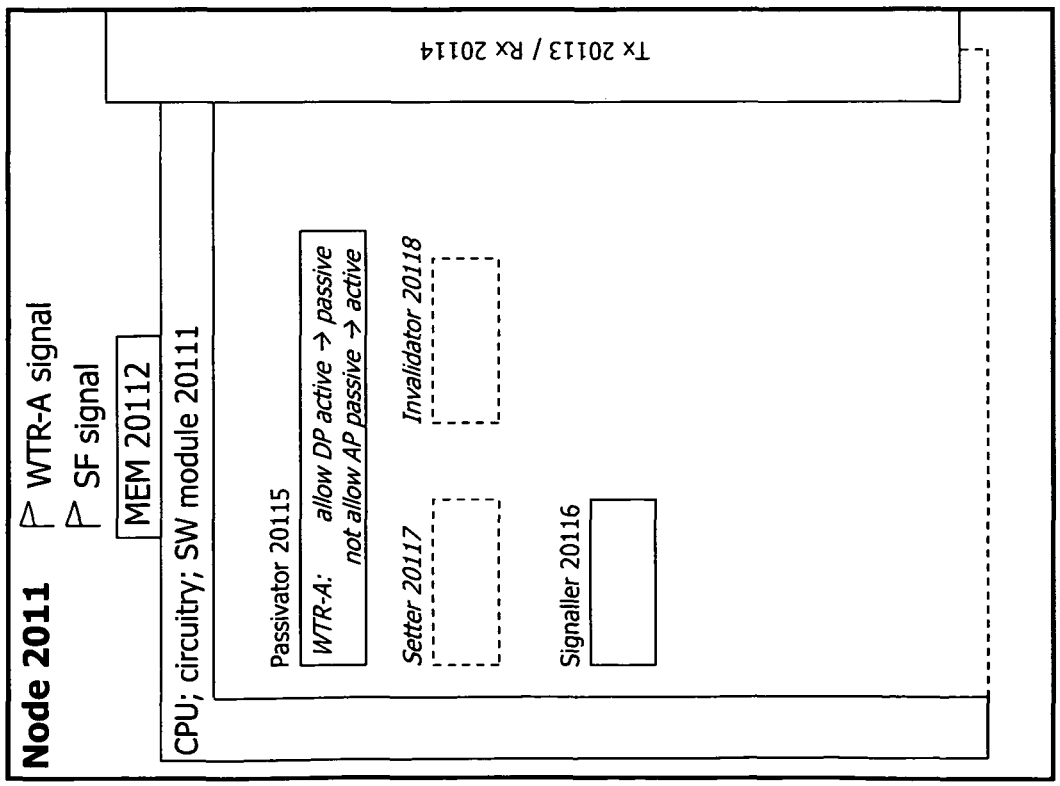
FIG. 3 shows the components comprised in an exemplary device embodiment realized in the form of an interconnect node.

FIG. 3 shows embodiments of two interconnect nodes 2011, 2012 comprised in a system/network 200 for status handling. Specifically, FIG. 3 illustrates the components comprised by the interconnect nodes 2011, 2012. In one implementation, the two interconnect nodes 2011, 2012 belong to the same network (in a similar manner as interconnect nodes 1011 and 1012 or interconnect nodes 1030, 1032 illustrated in FIGS. 1A and 1B).

As shown in FIG. 3, the first interconnect node 2011 comprises a core functionality (e.g., a central processing unit (CPU), dedicated circuitry and/or a software module) 20111, a memory (and/or database) 20112, a transmitter 20113 and a receiver 20114. Moreover, the first interconnect node 2011 comprises a passivator 20115, a signaller 20116, an optional setter 20117 and an optional invalidator 20118.

Further, as shown in FIG. 3, the second interconnect node 2012 comprises a core functionality (e.g., a CPU, dedicated circuitry and/or a software module) 20121, a memory (and/or database) 20122, a transmitter 20123 and a receiver 20124. The second interconnect node 2012 further comprises an activator 20125, an optional setter 20126 and an optional invalidator 20127.

As indicated by the dashed extensions of the functional blocks of the CPUs 201$x$1 (wherein x=1 and/or 2), the passivator 20115, the signaller 20116, the setter 20117 and the invalidator 20118 (of the first interconnect node 2011) and the activator 20125, the setter 20126 and the invalidator 20127 (of the second interconnect node 2012) as well as the memory 201$x$2, the transmitter 201$x$3 and the receiver 201$x$4 may at least partially be functionalities running on the CPUs 201$x$1, or may alternatively be separate functional entities or means controlled by the CPU 201$x$1 and supplying the same with information. For both the first interconnect node 2011 and the second interconnect node 2012, the transmitter and receiver components 20113, 20114 and 20123, 20124 may be realized to comprise suitable interfaces and/or suitable signal generation and evaluation functions.

The CPUs 201$x$1 may be configured, for example by software residing in the memories 201$x$2, to process various data inputs and to control the functions of the memory 201$x$2, the transmitter 201$x$3 and the receiver 201$x$4 (as well as the passivator 20115, the signaller 20116, the setter 20117 and the invalidator 20118 (of the first interconnect node 2011) and the activator 20125, the setter 20126 and the invalidator 20127 (of the second interconnect node 2012)). The memory 201$x$2 may serve for storing program code for carrying out the methods according to the aspects disclosed herein, when executed by the CPU 201$x$1.

It is to be noted that the transmitter 201$x$3 and the receiver 201$x$4 may alternatively be provided as an integral transceiver, as is shown in FIG. 3. It is further to be noted that the transmitters/receivers 201$x$3, 201$x$4 may be implemented as physical transmitters/receivers for transceiving via an air interface or a wired connection (e.g., between the first and second interconnect nodes), as routing entities/interfaces between network elements (e.g., for interfacing with the network), as functionalities for writing/reading information into/from a given memory area (e.g., when a single controller is disposed for the first and second interconnect nodes) or as any suitable combination of the above. At least one of the above-described passivator 20115, signaller 20116, setter 20117 and invalidator 20118 (of the first interconnect node 2011) and activator 20125, setter 20126 and invalidator 20127 (of the second interconnect node 2012), or the respective functionalities, may also be implemented as a chipset, module or subassembly.

Figure 4:
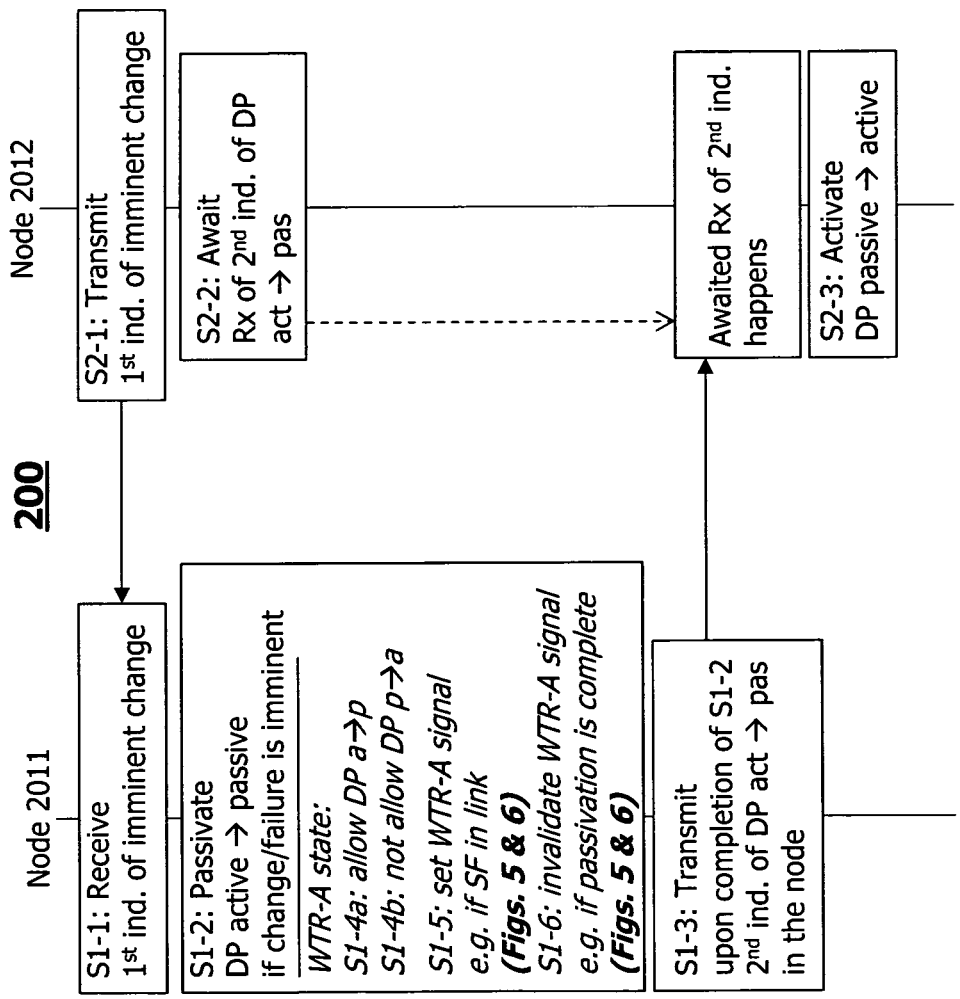
FIG. 4 shows a method embodiment which also reflects the interaction between the components of the device embodiment.

FIG. 4 illustrates an embodiment of a method for status handling in the interconnect nodes 2011 and 2012 of FIG. 3. In the signalling diagram of FIG. 4, signalling between elements is indicated in the horizontal direction, while time aspects between signalling are reflected in the vertical arrangement of the signalling sequence as well as in the sequence numbers. It is to be noted that the time aspects indicated in FIG. 4 do not necessarily restrict any one of the method steps shown to the step sequence outlined in FIG. 4. This applies in particular to method steps that are functionally disjunctive with each other.

Figure 2:
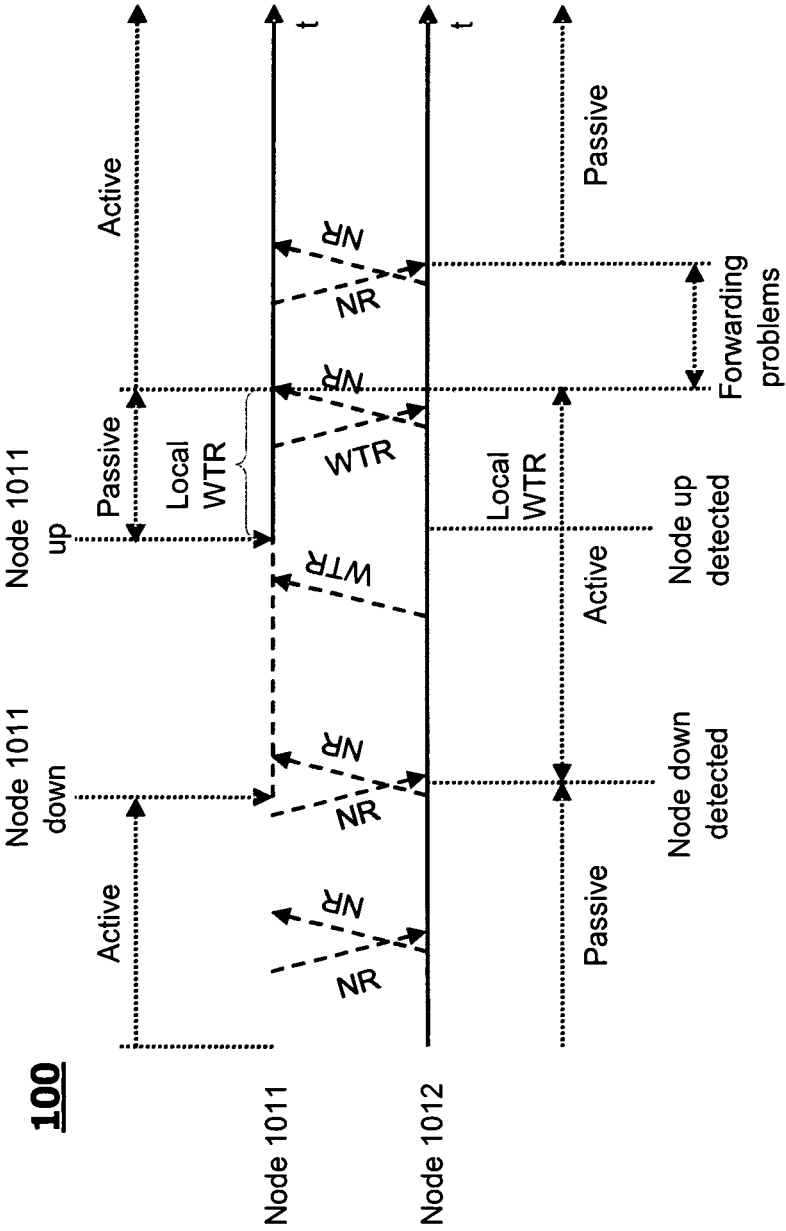
FIG. 2 shows a sequence of events that leads to the forwarding errors illustrated in FIGS. 1A and 1B.

Referring still to the signalling diagram of FIG. 4 (to be read along with the interconnect node(s) 2011 and 2012 illustrated in FIG. 3), in step S2-1, the transmitter 20123 of the second node 2012 transmits, to the first interconnect node 2011, a first indication that a change has been or is about to be performed. In step S1-1, the receiver 20114 of the first node 2011 receives the first indication from the second node 2012. The change may generally be associated with the second node 2012 being capable of initially becoming passive again or initially having become passive again (e.g., in a similar manner as illustrated in FIG. 2 for node A in accordance with the steps performed up to "Node 1011 up"). When a node comes back (e.g., reboots), then it typically comes back as passive for each service. That is, a node coming back will not activate itself immediately.

The change indicated in step S2-1 may comprise a recovery of the interconnect node 2012 from a node fault (e.g., as generally illustrated in FIG. 2), a topology change in the network 200, or a configuration change in the network 200. The topology change may involve addition/removal of an interconnect node (and the commissioning of the new interconnect node), and the configuration change may involve a new setting for a given service that now, for example, needs to be served actively instead of passively.

In step S1-2, the passivator 20115 of the first node 2011 passivates, responsive to the reception of the first indication, the data plane being in the active status to the passive status (e.g., for one or more services that may optionally be signalled by the first indication).

Figure 5:
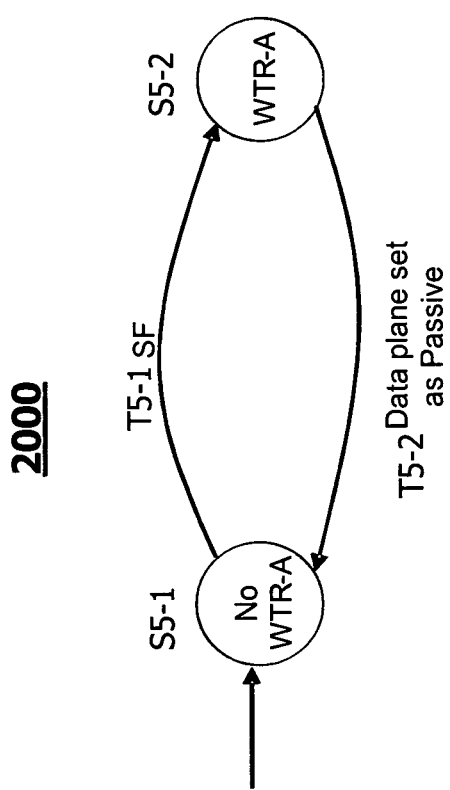
FIG. 5 shows a state transition diagram involving a WTR-A state.
Figure 6:
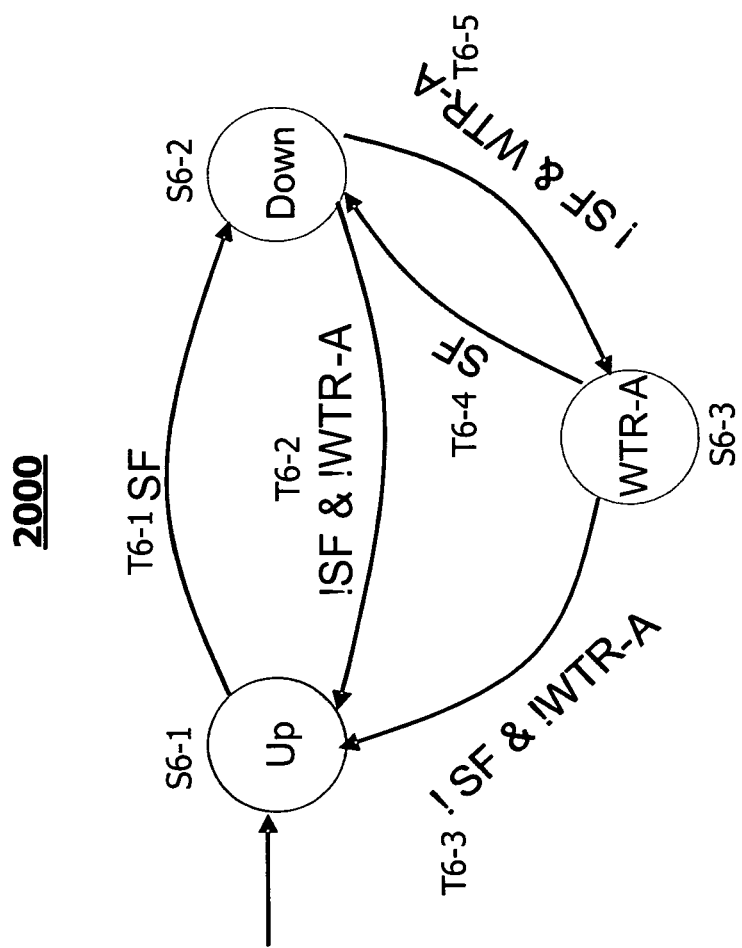
FIG. 6 shows a finite state machine (FSM) for describing the processing in the interconnect node.

As is shown in FIGS. 3, 5 and 6, passivation (and also activation) may be augmented by an interconnect node fault management state machine 2000 in the first (and second) node 2011 (and 2012) involving a Wait-to-Restore-Active, WTR-A, state S5-2 of the node. In the WTR-A state S5-2, there may be a step S1-4$a$ for allowing to passivate the data plane (of the current node) to the passive status, and/or a step S1-4$b$ for not allowing to activate the data plane (of the current node) to the active as status. In the following, when referring to a state machine, it is to be noted that the letter "S" stands for "state", and the letter 'T' stands for "transition". When referring to methods, the letter "S" stands for "step".

Further, the state machine 2000 comprises a state S5-1 "no WTR-A", meaning that the interconnect node does not send the WTR-A signal. Transition T5-1 comprises the condition Signal Fail (SF), i.e., the node involved assumes the other node to be non-operational. If T5-1 is true, then S5-1 is left and S5-2 (WTR-A) is entered, in which the current interconnect node may periodically send the WTR-A signal. Likewise, T5-2 comprises the condition "data-plane set as passive", i.e., the current node has completed passivation of its data plane for all services the current node had (initially) been configured to be in the passive state, if the other node is operational.

If T5-2 is true, then the WTR-A state S5-2 is left and S5-1 is entered, for instance, the current node stops sending (or invalidates) the WTR-A signal.

In step S2-2, the receiver 20124 of the second node 2011 is set to await, from the first node 2011, reception of a second indication that the data plane in the first node 2011 has been set to the passive status (e.g., for the one or more services signalled with the first indication in step S2-1). As mentioned above, this may mean that T5-2 is fulfilled (e.g. if the current node has stopped sending or invalidated the WTR-A signal/indication).

Then, in step S1-3, the transmitter 20113 of the first node 2011 transmits, upon completion of the passivation, the second indication of the passive status of the data plane to the second node 2012. Thus, the awaited reception of the second indication happens in step S2-2. It is to be noted that the term "reception of the second indication" may as well mean that the WTR-A signal of the first node is no longer received.

Thus, in step S2-3, the activator 20216 of the second node 2012 activates, responsive to the received second indication, the data plane of the node 2012 from the passive status to the active status for the one or more services involved, in particular for the active service set in the second node 2012.

In the following, with reference to the finite state machine 2000 shown in FIG. 6 (and the different processing operations illustrated in FIGS. 7 to 9 involved when entering the states), operation of the involved (or "current") node (which may be the first node 2011) is described. Note that all transitions (such as SF and WTR-A) refer to signals received from the other node (which may be the second node 2012). Naturally, the roles of "current node" and "other node" can be reversed. Further, terms such as "x" means signal x to be set (or raised), and "!x" means signal x to be invalidated (or cleared) in the current node or means that signal x is no longer received in the other node.

For reasons of descriptive simplicity regarding the processings hereinbelow, the other node may have a set of active services that are pre-set to be served with the active status in the other node, and a set of passive services that are pre-set to be served with the passive status in the other node. In one example, the services may be VLAN services as identified by VLAN Identifiers (VIDs).

When starting the finite state machine (FSM) 2000, the current node enters S6-1, which state is to assume that the other node is operational (or "up") (see also FIG. 2). In S6-1, the current node may have a passive status for all services. Upon reception of a Signal Fail (which may be a Loss Of Signal, LOS, of a link or tunnel) from the other node, FSM 200 transits (T6-1) to S6-2, in which state S6-2 the current node assumes that the other node is not operational (or "down").

Figure 7:
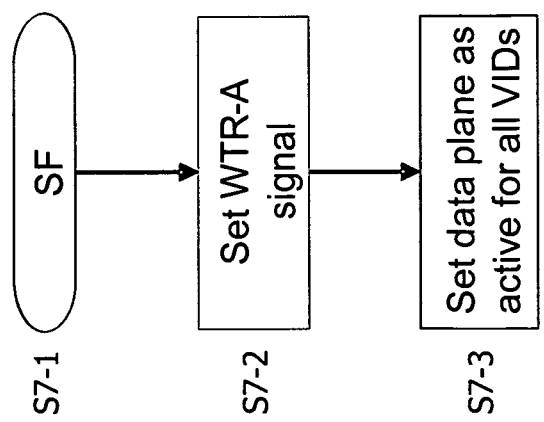
FIG. 7 shows the processing involved when setting a Signal Fail (SF) signal.

Upon setting the SF signal (transitions T5-1 and T6-1 in FIGS. 5 and 6), the processing in FIG. 7 is initiated (step S7-1). Accordingly, in step S7-2, the WTR-A signal is set (or raised), i.e., the current node enters state S5-2. In step S7-3, the data plane of the current node is set as active for all services (so as to fully back-up the other node that is assumed to be non-operational for the services in question).

When in state S6-2, the FSM 2000 monitors the signals SF and WTR-A received from the other node. While the other node maintains the SF signal, S6-2 is not left. As soon as the other node has recovered or is about the recover, the SF signal of the other node is invalidated or cleared ("!SF").

Figure 8:
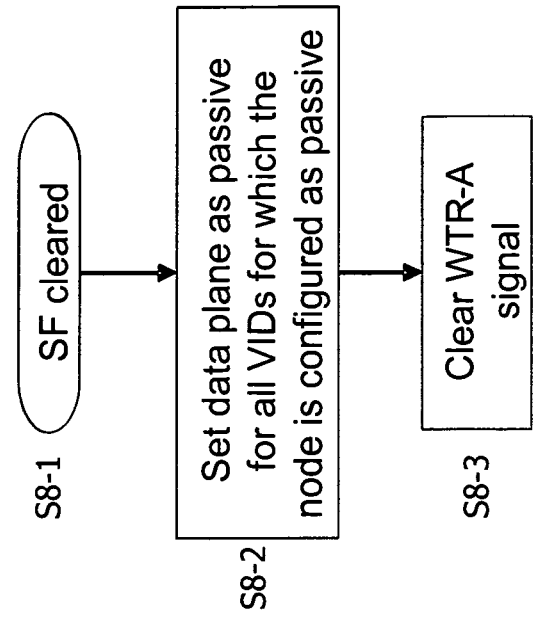
FIG. 8 shows the processing involved when invalidating the SF signal.

Upon invalidating the SF signal of the other node, the processing shown in FIG. 8 is initiated (step S8-1). Then, in step S8-2, the current node is (re-)configured to set its data plane to the passive status for the passive service set. This might be considered as a "return to normal" for the current node. Afterwards, in step S8-3, the WTR-A signal of the current node is invalidated (or cleared), i.e., transition T5-2 is performed.

However, the FSM 2000 is responsive to the WTR-A signal of the other node, i.e., responsive to whether the other node is still in the state of having an active data plane for the passive set of services. Hence, the FSM 2000 still being in the S6-2, if the SF signal is invalidated, the WTR-A signal of the other node is monitored. If the other node is still in the WTR-A state, the WTR-A signal of the other node remains set. If so, FSM 2000 leaves S6-2 and enters S6-3, in which the current node enters the WTR-A state, and waits with the activation for the active service set in the current node until the other node has invalidated or cleared the WTR-A signal.

When in the WTR-A state S6-3, the FSM 2000 continues to monitor the SF signal from the other node. If the other node gives rise to (another) SF (T6-4), the FSM 200 leaves the WTR-A state S6-3 and re-enters the above-described "down" state S6-2.

When the current node either remains in the "down" state S6-2 or the WTR-A state S6-3, only invalidation of both the SF and WTR-A signal from the other node (transitions T6-2 and T6-3) can cause the FSM to re-enter the above-described "up" state S6-1, in which the current node assumes normality of the other node, which may mean that the other node is operational (or "up") and has passivated its data plane for the passive service set.

Figure 9:
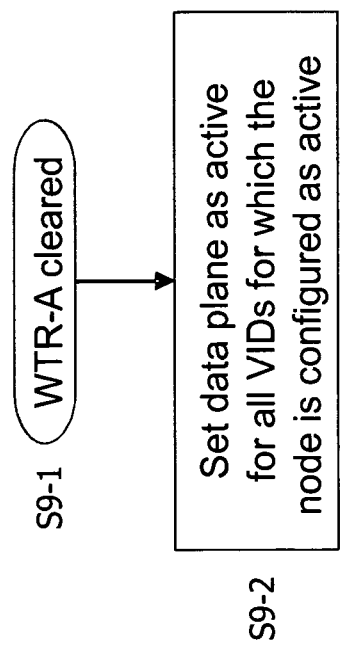
FIG. 9 shows the processing involved when invalidating a WTR-A signal.

Upon invalidation of the WTR-A signal from the other node, the processing in FIG. 9 is entered (step S9-1), and as the normality in the other node is restored, the data plane of the current node is set as active for the active service set of the current node (Step S9-2).

As has become clear from the above, it is advantageous to continuously monitor the WTR-A signal from the other node. In other words, the faster the setting/invalidation of the WTR-A of the other node is detected, the more responsive the above-described FSM 2000 can operate. To do this, the WTR-A signal (from the other node) may be signalled in a periodically received Physical Data Unit, PDU. For example, the PDU may be associated with at least one CCM frame received by the current node. If so, a flag for the WTR-A signal in the one or more CCM frames may be the second most significant bit of a Flags field of a common CFM header. Alternatively, the PDU may be associated with the ICCP or the LACP. As a further alternative, the PDU may be associated with a received status of external interface links of the node.

The interconnect nodes 2011 and 2012 may conform to the DRNI Specification. The interconnect node may be realized as a Provider Edge Bridge, Provider Backbone Edge Bridge or VPLS PE node.

As discussed above with respect to exemplary embodiments, the technique presented herein may ensure that (temporary) forwarding problems occurring during node recovery, for example as illustrated in FIG. 2 in the context of DRNI node fault management, can be avoided. Accordingly, when implemented for example in a scenario similar to that illustrated in FIG. 2, status collisions and the resulting forwarding problems will not occur.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for status change handling in an interconnect node, wherein the method is performed in the interconnect node and comprises:

receiving, by the interconnect node and from another node, a first indication of a given service for which a change has been or is about to be performed, the given service having a data plane that is active in the interconnect node and passive in the other node as a backup to the active data plane;

exchanging data plane roles with the other node, the exchanging comprising passivating the data plane of the interconnect node, by the interconnect node and in response to receiving the first indication, the passivating comprising selectively changing the data plane of the interconnect node from active status to passive status with respect to the given service;

transmitting, upon completion of the passivating of the data plane of the interconnect node, a second indication of the passive status of the data plane of the interconnect node with respect to the given service from the interconnect node to the other node.

2. The method of claim 1, wherein the interconnect node is a Distributed Resilient Network Interconnect (DRNI) node.

3. The method of claim 1, wherein the change is one of the following:
a recovery of the interconnect node from a node fault;
a topology change in a network;
a configuration change in a network.

4. The method of claim 3, wherein the interconnect node further comprises a fault management state machine involving a Wait-to-Restore-Active (WTR-A) state of the interconnect node.

5. The method of claim 4, further comprising:
in the WTR-A state, allowing passivation of the data plane to the passive status; and/or
in the WTR-A state, not allowing the data plane to change to the active status.

6. The method of claim 4, wherein a WTR-A signal signals whether the interconnect node transits into or from the WTR-A state.

7. The method of claim 6, further comprising setting the WTR-A signal if there is a signal fail (SF) signal.

8. The method of claim 7, wherein the setting the WTR-A signal is performed responsive to a detection that one of a tunnel and a link associated with the interconnect node is down.

9. The method of claim 7, further comprising invalidating the WTR-A signal upon completion of passivating the data plane in the interconnect node to the passive status.

10. The method of claim 9, wherein the invalidating of the WTR-A signal is preceded by invalidation of a signal fail (SF) signal.

11. The method of claim 10, wherein the invalidating of the SF signal is performed responsive to detection that one of a tunnel and a link associated with the interconnect node is available.

12. The method of claim 6, further comprising signaling the WTR-A signal in a periodically received Physical Data Unit (PDU).

13. The method of claim 12, wherein the PDU is associated with at least one Continuity Check Message frame received by the interconnect node.

14. The method of claim 12, wherein the PDU is associated with one of Inter-Chassis Communication Protocol (ICCP), and Link Aggregation Control Protocol (LACP).

15. The method of claim 12, wherein the PDU is associated with a received status of external interface links of the interconnect node.

16. The method of claim 1, further comprising:
a set of active services that are pre-set to be served in the active status;
a set of passive services that are pre-set to be served in the passive status.

17. The method of claim 16, wherein the data plane is activated for both sets of services.

18. The method of claim 16, wherein the data plane is activated only for the set of active services.

19. The method of claim 16, wherein each service is described by one of a Virtual Local Area Network (VLAN) and a Service Interface Identifier (I-SID).

20. The method of claim 19, wherein a flag for the WTR-A signal in the one or more Continuity Check Message frames is the second most significant bit of a Flags field of a common Connectivity Fault Management header.

21. A computer program product stored in a non-transitory computer readable medium for status change handling in an interconnect node, the computer program product comprising software instructions which, when run on one or more computing devices of the interconnect node, causes the interconnect node to:
receive, by the interconnect node and from another node, a first indication of a given service for which a change has been or is about to be performed, the given service having a data plane that is active in the interconnect node and passive in the other node as a backup to the active data plane;
exchange data plane roles with the other node, the exchanging comprising passivate the data plane of the interconnect node, by the interconnect node and in response to receiving the first indication, the passivating comprising selectively changing the data plane of the interconnect node from active status to passive status with respect to the given service;
transmit, upon completion of the passivation of the data plane of the interconnect node, a second indication of the passive status of the data plane of the interconnect node with respect to the given service from the interconnect node to the other node.

22. A device for status change handling in an interconnect node, the device comprising:
at least one processor configured to:
receive, by the interconnect node and from another node, a first indication of a given service for which a change has been or is about to be performed, the given service having a data plane that is active in the interconnect node and passive in the other node as a backup to the active data plane;
exchange data plane roles with the other node, the exchange comprising passivating the data plane of the interconnect node, by the interconnect node and in response to receiving the first indication, the passivating comprising selectively changing the data plane of the interconnect node from the active status to the passive status with respect to the given service;
transmit, upon completion of the passivation of the data plane of the interconnect node, a second indication of the passive status of the data plane of the interconnect node with respect to the given service from the interconnect node to the other node.

23. The device of claim 22, wherein the interconnect node is one of:
a Provider Edge Bridge node;
a Provider Backbone Edge Bridge node;
a Virtual Private Local Area Network Service Provider Edge node.

24. A method for status change handling in an interconnect node, wherein the method is performed in the interconnect node and comprises:

transmitting, to another node, a first indication of a given service for which a change has been or is about to be performed, the given service having a data plane that is active in the other node and passive in the interconnect node as a backup to the active data plane;

exchanging data plane roles with the other node, the exchanging comprising awaiting reception, from the other node, of a second indication that the data plane of the given service in the other node has been set to passive status, and in response, activating the data plane of the given service in the interconnect node, the activating comprising selectively changing the data plane of the given service in the interconnect node from passive status to active status.

25. A device for status change handling in an interconnect node, the device comprising:

at least one processor configured to:

transmit, to another node, a first indication of a given service for which a change has been or is about to be performed, the given service having a data plane that is active in the other node and passive in the interconnect node as a backup to the active data plane;

exchange data plane roles with the other node, the exchange comprising awaiting reception, from the other node, of a second indication that the data plane of the given service in the other node has been set to passive status, and in response, activating the data plane of the given service in the interconnect node, the activating comprising selectively changing the data plane of the given service in the interconnect node from passive status to active status.

* * * * *